A. H. PEYCKE.
BRAKE ARRANGEMENT.
APPLICATION FILED APR. 22, 1918.
1,323,312.
Patented Dec. 2, 1919.
2 SHEETS—SHEET 2.
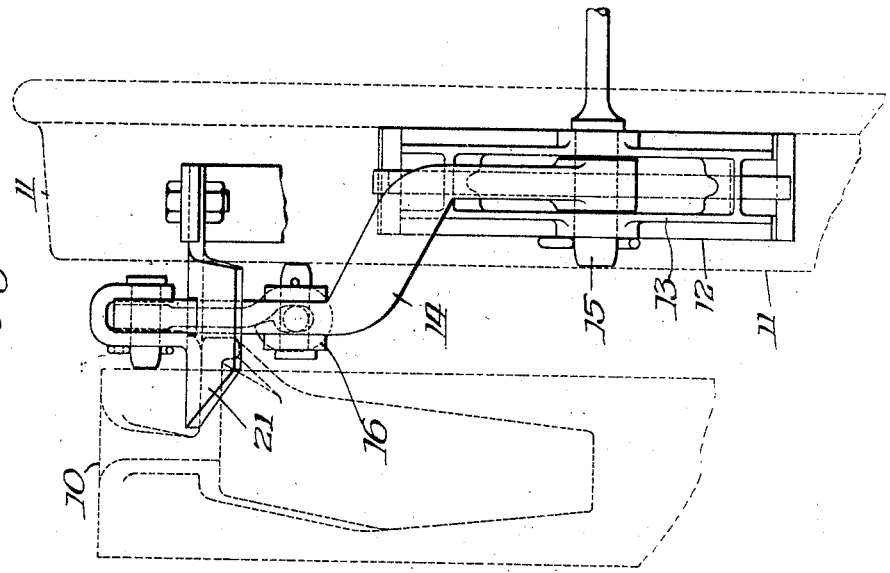
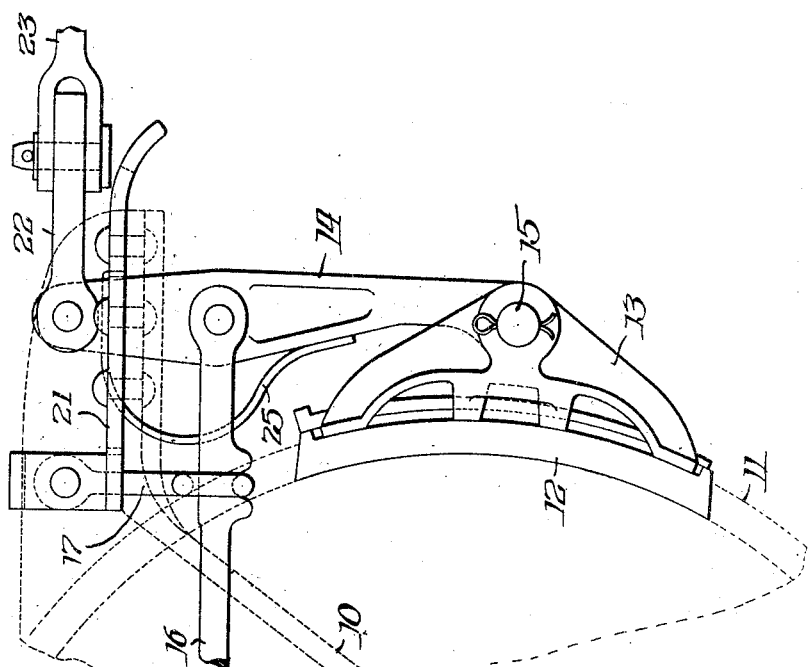

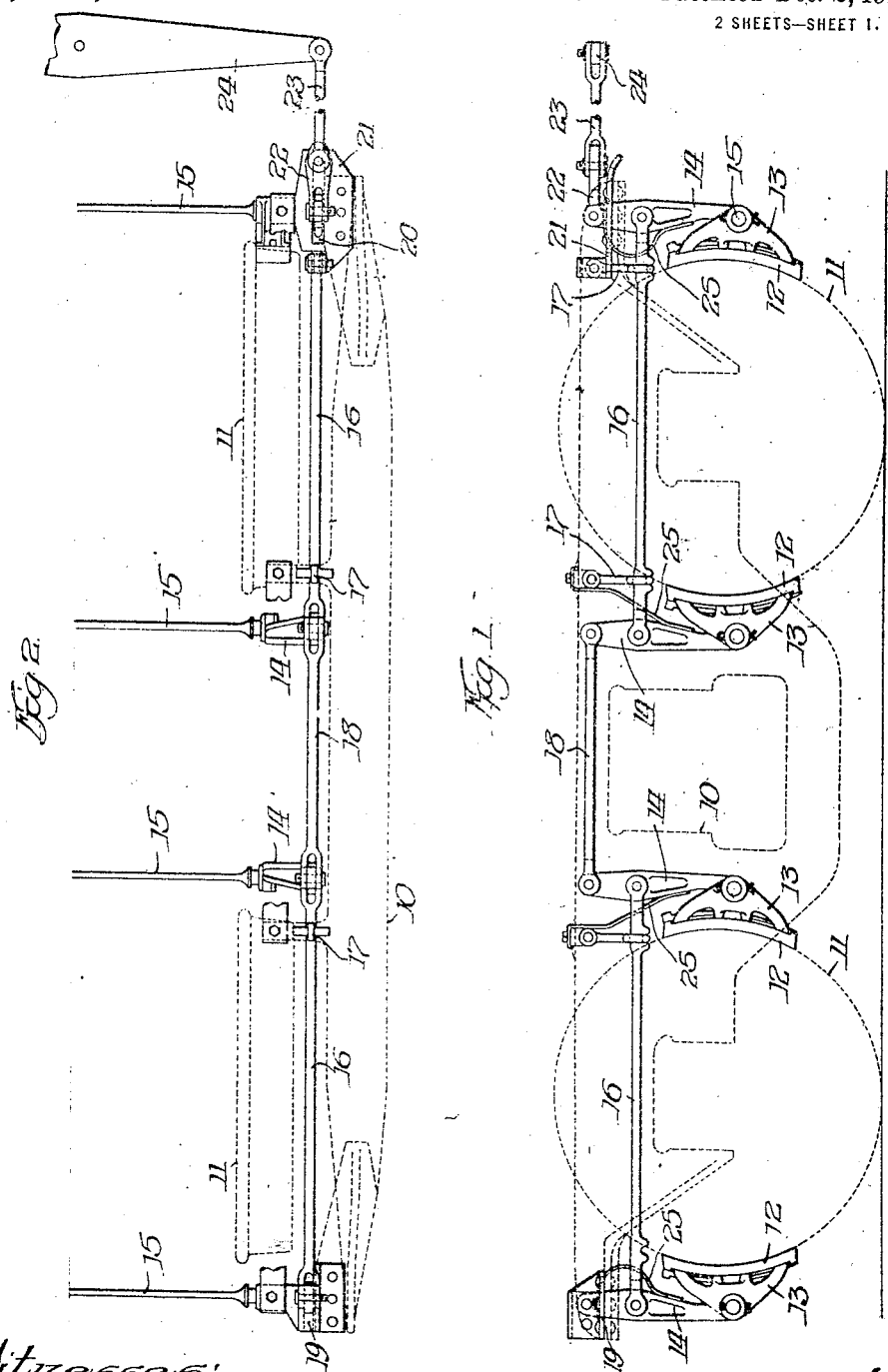

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE ARRANGEMENT.

1,323,312.

Specification of Letters Patent.

Patented Dec. 2, 1919.

Application filed April 22, 1918. Serial No. 229,930.

*To all whom it may concern:*

Be it known that I, ARMAND H. PEYCKE, a citizen of the United States, and resident of Chicago, in the county of Cook and State of Illinois, have invented certain new and useful Improvements in Brake Arrangements, of which the following is a specification.

This invention relates to a brake arrangement.

One of the objects of this invention is to simplify clasp brake rigging of particular value for freight cars.

Another object is to reduce the number of parts of clasp brake rigging to a minimum and improve the coöperative association of the elements comprising the rigging.

Another object is to provide a simple compact and durable clasp brake rigging, adapted to meet the requirements for successful commercial operation.

These and other objects are accomplishd by means of the brake mechanism disclosed on the accompanying sheets of drawings, in which, Figure 1 is a fragmentary side elevation of railway car truck embodying my invention.

Fig. 2 is a fragmentary plan view of the same.

Fig. 3 is a fragmentary side elevation on an enlarged scale of the brake lever and supporting arrangement, and Fig. 4 is an end elevation of the arrangement shown in Fig. 3.

The various novel features of my invention will be apparent from the following description and drawings and will be particularly pointed out in the appended claims.

In my present invention I have reduced the number of parts of clasp brake rigging to a minimum, thereby greatly reducing the weight and cost and at the same time I have provided a rugged construction amply able to comply with service conditions.

By referring to the figures of the drawings, it will be noted that I have shown my invention in connection with a railway car truck including a side frame 10, which is supported by wheels 11. Brake shoes 12 carried by brake heads 13, arranged on opposite sides of each wheel are adapted to coöperate with the braking surface of the associated wheels 11. Pivotally connected to each of the brake heads 13, is a combined brake lever and hanger 14, the pivotal connection between the brake lever and head, taking the form of a rod 15, which extends between brake heads on opposite sides of the truck. These rods 15 dispense with the use of brake beams and in addition form the spacing means between the brake heads. When the brakes are applied the rods 15 are in shear at the point of pivotal connection between the brake levers and brake heads and as a whole are in tension. Pivotally connected to the brake levers or extending longitudinally therebetween are intermediate pull rods 16, which are maintained and supported in a horizontal position by hangers 17 secured to brackets carried by the side frame.

The intermediate brake levers 14 are connected by a top pull rod 18. The lever 14 at the head end of the truck is pivotally connected to and supported by a bracket 19 secured to the side frame 10. In each case the pull rods 16 are located between the wheels 11 and the side frame 10, the rods 18 being in alinement with the other pull rods 16. Accordingly, therefore, the levers 14 are offset or bent intermediate their ends, as shown particularly in Fig. 4, whereby the brake heads may be located in alinement with the braking surface of the wheels 11.

The brake lever 14 at the live end of the truck extends vertically through a longitudinally extending slot 20 in a bracket 21, secured to the side frame. By means of this arrangement the brake levers are maintained in proper longitudinal alinement and at the same time permitted the necessary movement incident to braking and releasing actions. Pivotally connected to the upper end of the live brake lever 14 is a member 22, forming one part of a swivel connection including a member 23, which in turn is connected to an equalizer bar 24. This swivel connection permits the necessary freedom of movement in a plurality of directions. Release springs 25, secured to the brackets hereinabove mentioned engage the brake levers for giving the brake levers a releasing movement, when braking pressure is discontinued. The equipment on both sides of the truck are the same and coöperate with each other in their common functions.

The bracket 21 acts as support for the entire brake rigging at the live lever end through hanger 17. It also acts as a guide for the hanger lever 14, allowing no transverse movement of the latter, at the same time allowing longitudinal movement of the hanger lever. It also acts as a partial support for the swivel 22 and 23, and also acts as an anchor for the release spring. In this particular case the brackets at the dead and live ends are all riveted on the frame, but if desired same may be formed integrally therewith.

By means of this simple, compact and durable construction many parts heretofore used in clasp brake rigging, are eliminated, thereby reducing the weight and cost.

It is my intention to cover all modifications of the arrangement shown which falls within the spirit and scope of the following claims.

I claim:

1. In brake mechanism, the combination of brake levers on opposite sides of a wheel, and a single pull rod connecting said levers and being located between the wheel and side frame and below the top of the latter.

2. In brake mechanism, the combination of a brake lever, and an operating rod connected to said lever and being located between the wheel and side frame and below the top of the latter.

3. In brake mechanism, the combination of brake levers on opposite sides of a wheel, brake shoes carried by said levers, and a single pull rod located between the wheel and side frame and below the top of the latter for connecting said levers.

4. In brake mechanism, the combination of brake levers on opposite sides of a wheel and each being offset and being in alinement with said wheel, brake heads connected to said levers, and a coöperating connection between said levers located intermediate the wheel and side frame.

5. In brake mechanism, the combination of brake levers on one side of each of a pair of wheels, said levers having offset portions in alinement with their associated wheels, a brake head carried by each of said levers in alinement with its corresponding wheel, and a rod extending between the levers for spacing the same transversely with respect to the car.

6. In brake mechanism, the combination of a bracket, a hanger lever engaging said bracket and guided thereby, a pull rod connected to said hanger lever, and a hanger supported by said bracket and connected to said pull rod for supporting the latter.

7. In brake mechanism, the combination of a bracket, a hanger lever engaging said bracket and guided thereby, a pull rod connected to said hanger lever, a hanger supported by said bracket and connected to said pull rod for supporting the latter, and a swivel connecting member connected to said hanger lever and supported by said bracket.

Signed at Chicago, Illinois, this 11th day of April, 1918.

ARMAND H. PEYCKE.

Witnesses:
CHAS. L. BYRON,
C. M. OBERBECK.